INVENTOR.
Stanley C. Vahey
BY
Maurice A. Crews
ATTORNEY

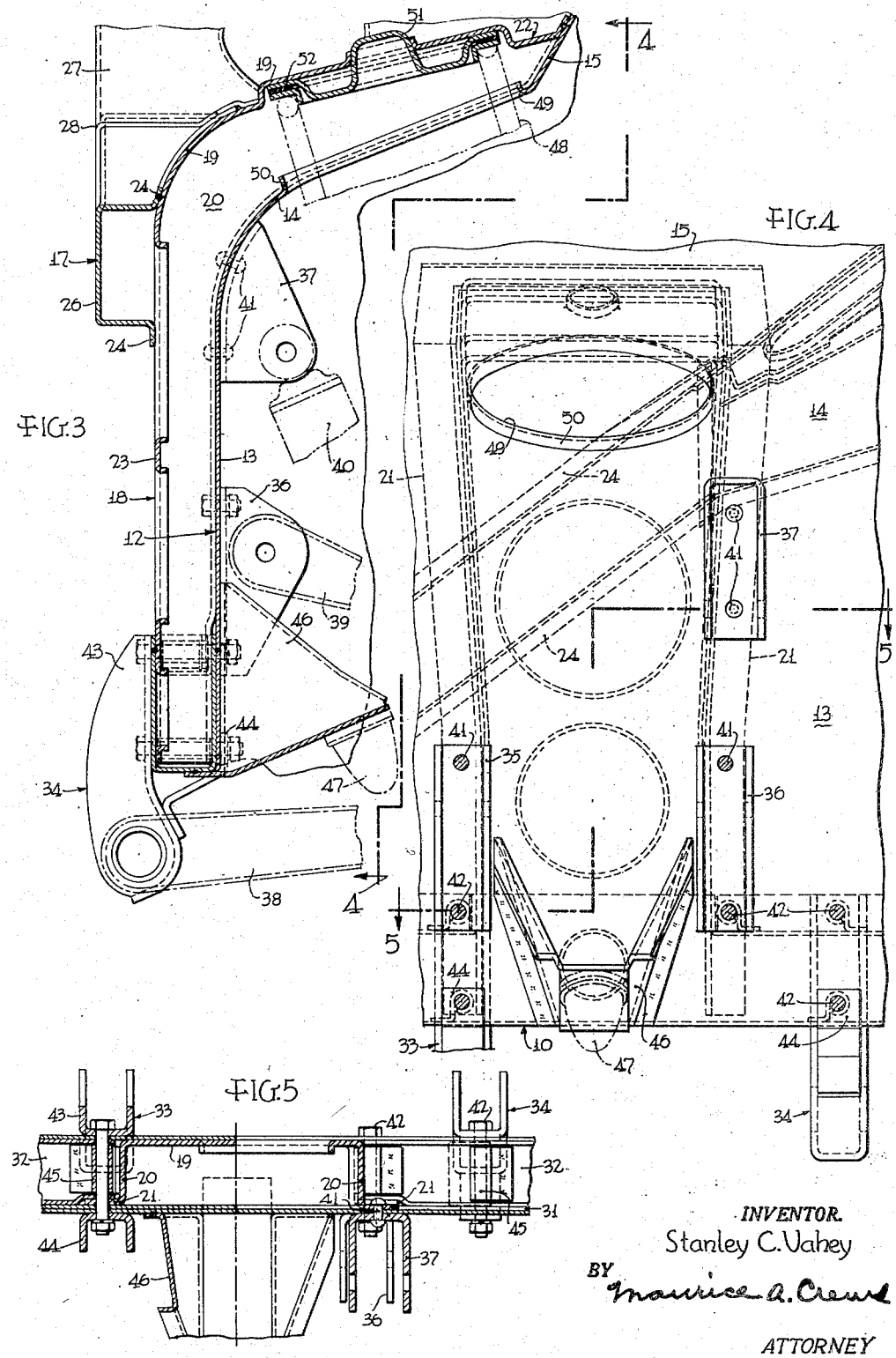

United States Patent Office 2,709,106
Patented May 24, 1955

2,709,106

RUNNING GEAR ATTACHMENT FOR SELF-SUPPORTING AUTOMOBILE BODIES

Stanley C. Vahey, Detroit, Mich., assignor to The Budd Company, Philadelphia, Pa., a corporation of Pennsylvania Application June 8, 1950, Serial No. 166,950

4 Claims. (Cl. 296—28)

The invention relates to a self-supporting automobile body designed for the attachment of parts of the running gear, particularly of the type comprising links or levers for guiding the road wheels for up and down movement, coil springs and telescoping shock absorbers.

Among the objects of the invention is a self-supporting or frameless automobile body which is simple in construction and of light weight, which is adequately strong and distributes the stresses from and to the running gear without objectionable stress concentrations, and which lends itself to convenient production and assembly of its parts.

These and other objects and advantages are achieved by reinforcements structurally secured to the insides of the wheel housings so as to reinforce the latter, and preferably constitute with them closed box-section reinforcements, in the attachment zone for the running gear. More specifically, the invention consists in an outwardly facing channel-section brace of angle shape and its securement to the upright skirt and the outwardly extending crown of a wheel housing, and in the use of the arm of the brace extending across the wheel housing crown as an abutment for one end of a wheel supporting coil spring.

The above and further objects, advantages, and features of the invention are fully described and will be more easily understood from the embodiment illustrated in the attached drawing and described in the following.

In the drawing:

Figure 3 is a fragmentary transverse section along line 3—3 of Figure 1 on a larger scale, indicating in dot-and-dash lines adjoining parts of the running gear;

Figure 4 is a fragmentary outside elevation seen in the direction of the arrows 4—4 of Figure 3; and Figure 5 is a fragmentary horizontal section along line 5—5 of Figure 4.

Figure 1:
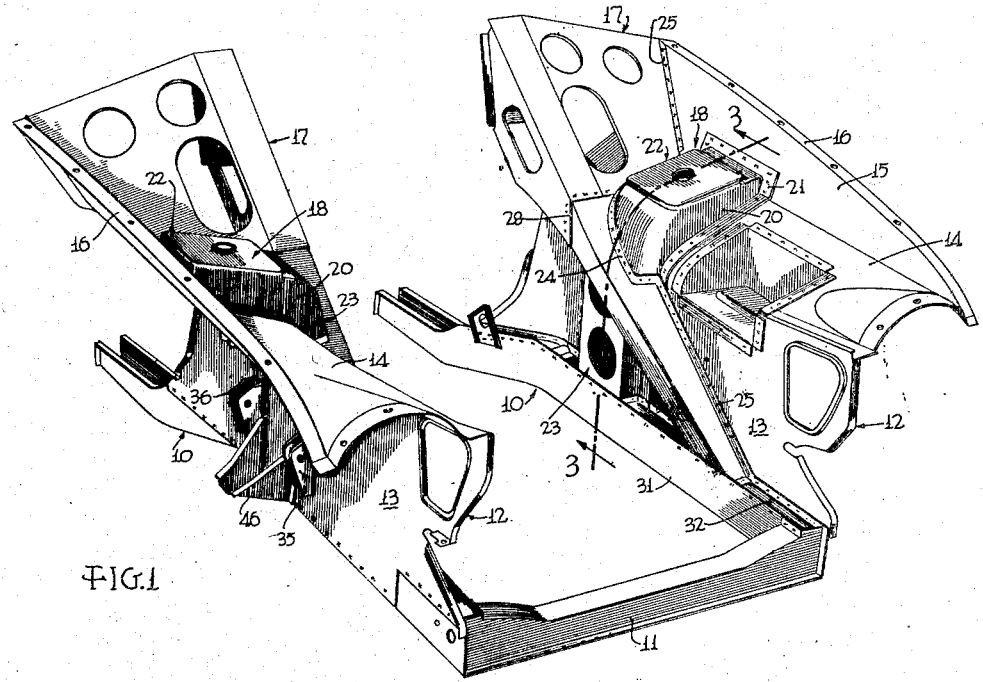
Figure 1 is a three-quarter front perspective of the forward end structure forming part of a self-supporting automobile body.
Figure 2:
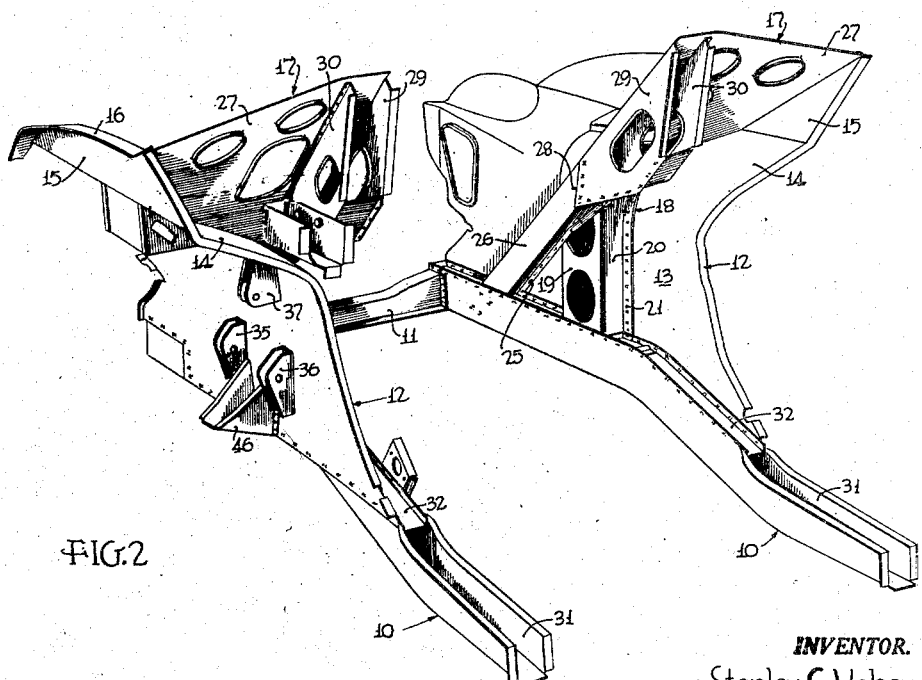
Figure 2 is a three-quarter rear perspective of the same structure.

The front end structure illustrated in the drawing comprises side sills 10 interconnected at the front by a cross brace 11. Motor compartment side walls or wheel housings 12 have the lower margins of their skirts 13 connected with the outsides of the sills 10. The skirts merge at the top into outwardly extending crowns 14 of the wheel housings, and the crowns merge into upwardly projecting portions 15 provided with flanges 16 for connection with fender and hood (not shown). Upwardly and rearwardly inclined webs or braces 17 have their outer margins connected with the respective wheel housings 12. The rear ends of sills 10, the rear margins of the wheel housings 12, and the rear margins of the braces 17 are designed for attachment to the front end of the body proper (not shown), as disclosed, for instance, in Patent No. 2,380,031 of Deisley, Ulrich, and Lindsay, issued July 10, 1945, for "Vehicle Structure, Especially Vehicle Front End Structure."

A generally upright member or brace 18 of outwardly facing channel or hat-section having a bottom wall 19 and side walls 20, is secured by its marginal flanges 21 to the inside of each wheel housing 12. Members 18 are of general angle form when viewed in the longitudinal direction of the body structure, the one arm 22 extending generally vertically and overlying the skirt 13, and the other arm 23 extending outwardly and overlying the crown 14 and part of extension 15 of the respective wheel housing 12. The reinforcing braces 17 are provided with cut-outs for the passage of brace 18. Marginal flanges 24 along the cut-outs are fitted against and secured to brace 18 and form continuations of the flanges 25 by which the braces 17 are secured to the wheel housings 12.

Each inclined brace 17 is composed of a lower relatively narrow hat-section member 26 and an upper wide angle section member 27. The two members 26, 27 meet in the regions of the cut-outs and are overlappingly secured to each other at 28. This two-piece construction saves material and facilitates the assembly. The upper member 27 has the inner marginal portion of its top arm or web and its downwardly directed arm 29 connected with an angle section 30 for forming a closed box-section in continuation of the closed box-section formed by members 26 and skirt 13 of the respective wheel housing.

The side sills 10 are composed of a deep upwardly facing lower channel section 31 and shallow upper channel section members 32 telescopingly secured in the mouth of member 31.

Braces 17 and 18 pass through spaces between upper sill members 32 and have their lower ends secured to the respective sill member 31 in the interior thereof.

Running gear attachment means in the form of bearing brackets 33, 34, 35, 36, 37 are secured to each side of the illustrated front end structure. Brackets 33, 34 serve for the attachment of lower arms or wishbone members 38, and brackets 35, 36 serve for the attachment of upper arms or wishbone members 39. The members 38, 39 have their outer ends (not shown) journaled to a steering wheel supporting structure. The arms 38, 39 and their connection to the brackets 33 to 36 are only sketchily illustrated. The road wheel with its supporting structure, and the connection of the latter to the outer ends of the arms 38, 39 are not illustrated and may be of well-known design. Bracket 37 forms a bearing for the upper end of a telescoping shock absorber 40, the lower end of which is not shown and may be connected in well-known manner to a wheel supporting structure.

Brackets 33, 34, 35, 36 are secured by rivets 41 or bolts 42, respectively, to the wheel housing skirt 13 and the flanges 21 of brace 18. The width of brace 18 and its arrangement are such that the location of the flanges 21 coincides with the attachment zones for the brackets 33, 34, 35. The brackets 33, 34 embrace with inner and outer upwardly projecting arms 43, 44 the respective side sill 10 and are held by bolts 42 extending through said arms and through spacer bushings 45 inserted between the walls of the sill 10.

A bracket 46 welded to the outside of skirt 12 and sill 10 supports a resilient bumper 47 limiting the upward movement of the wheel supporting linkage system.

A coil spring 48, the upper end of which is diagrammatically shown in Figure 3, engages by the lower end the wheel supporting structure in a well-known, not illustrated manner. The upper end of spring 48 passes through a large opening 49 in crown 14 of the wheel housing. The margin of this opening is reinforced by an up-turned flange 50. The end of the spring engages by means of discs 51 and a vibration absorbing insert 52, the bottom wall 19 of the outwardly extending arm 23 of brace 18. Brace 18 and disc 51 mutually strengthen each other in the region engaged by the upper end of spring 48.

The illustrated structure is composed of sheet metal stampings which are mostly connected with each other by electric spot welding as indicated in conventional manner throughout the drawing.

The formation of box-sections by wheel housings 12 and braces 17, 18 imparts great strength combined with light weight. The provision of the braces 18 in the attachment zones for the wheel supporting links, shock absorbers and springs insures transfer of the stresses without objectionable stress concentration. The stress transfer is further improved by the intersection and connection of the braces 18 with the side sills 10 and inclined braces 17.

While the drawing illustrates the application of the invention to the front end structure of an automobile, it will be understood that the invention may also be applied to the rear end. It will be further understood that the invention is not necessarily restricted to the combination of the new vertically and outwardly extending brace with the known inclined brace. More generally, it will be understood that the invention is not restricted to the details of the illustrated embodiment but is susceptible to modifications and adaptations which will occur to those skilled in the art.

What is claimed is:

1. Front end construction for a self-supporting automobile body comprising, a hollow-section side sill, a wheel housing secured by its lower margin to the outer wall of said sill, a generally upright, outwardly facing channel-section brace secured to the inner surface of said wheel housing, said brace having its lower end extended into and secured in the interior of said sill, said brace reinforcing said sill and wheel housing in attachment zones of running gear supporting means.

2. In a self-supporting automobile body structure having side sills extending to one end of the structure, inclined braces connected with and extending upwardly from said sills toward the mid-region of the structure, wheel housings connected with the outer margins of said sills and said inclined braces, and further, generally upright braces of hollow-section secured to the inner surfaces of the wheel housings and to said sills, passing through cut-outs of said inclined braces and being welded to the margins of said cut-outs, said further braces being arranged in attachment zones of running gear to reinforce the structure in such zones and to aid in the distribution of the stresses from the running gear into the body structure.

3. Front end construction for a self-supporting automobile body comprising, a hollow-section side sill, a wheel housing secured by its lower margin to said sill, an outwardly facing channel-section brace secured by marginal flanges to the inner surface of said wheel housing and having its lower end extended into and secured in the interior of said sill, and brackets of running gear supporting means being secured to said body by means passing through said wheel housing and said flanges.

4. In a self-supporting automobile body structure having a side sill extending to one end of the structure, an inclined brace connected with and extending upwardly from said sill toward the mid-region of the structure, a wheel housing connected with the outer margins of said sill and said inclined brace, and a further generally upright brace secured to the inner surface of the wheel housing, passing through a cut-out of said inclined brace and being welded to the margins of said cut-out and to said side sill, said inclined brace comprising a web extending inwardly from said wheel housing and increasing in width from its lower toward its upper end, said inclined brace being formed of two members meeting and interconnected in the region of said cut-out.

References Cited in the file of this patent

UNITED STATES PATENTS

| | | |
|---|---|---|
| 2,018,653 | Best | Oct. 29, 1935 |
| 2,250,654 | Saives | July 29, 1941 |
| 2,299,926 | Phelps | Oct. 27, 1942 |
| 2,322,890 | Slack | June 29, 1943 |
| 2,350,037 | Hofheins et al. | May 30, 1944 |
| 2,403,145 | Ulrich | July 2, 1946 |
| 2,436,620 | Tarbox | Feb. 24, 1948 |